Sept. 5, 1933.   G. CAMPBELL   1,925,301
VALVE
Filed July 2, 1929
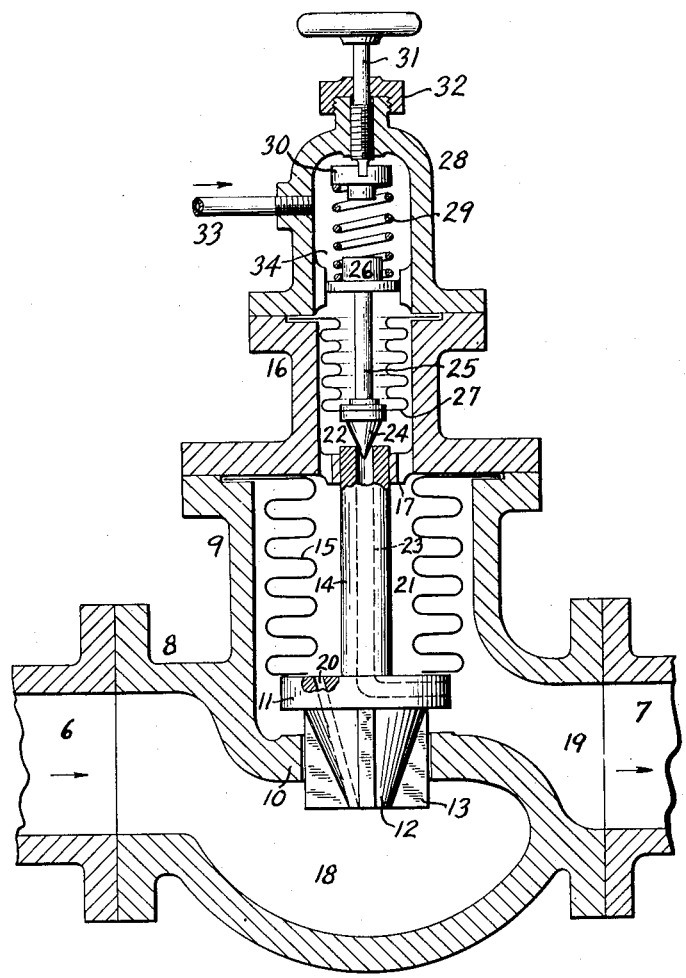
INVENTOR:
Grant Campbell,
BY
Morrison, Kennedy & Campbell,
ATTORNEYS.

Patented Sept. 5, 1933

1,925,301

UNITED STATES PATENT OFFICE 1,925,301

VALVE

Grant Campbell, Short Hills, N. J.

Application July 2, 1929. Serial No. 375,507

9 Claims. (Cl. 137—153)

This invention is a novel valve, having reference more especially to an automatic or self regulating valve by the use of which any given regulating pressure may be caused to control the flow through the valve.

A typical instance of the use of the present invention is for the control of feed of water to a boiler, the valve hereof being employed as an automatic feed valve, controlled by a suitable control pressure. For example, the present valve may be employed in lieu of the valve 12 shown in my prior Patent No. 1,697,342 of January 1, 1929, this being in the line of feed from the feed pump to the boiler and being controlled by the regulating pressure in the pipe 48. The present invention however is adapted for many other uses. For example it may be used as a pressure reducing valve, wherein the delivered pressure is employed as the regulating pressure for the valve, to afford a uniform delivered pressure. Or a pump governing valve may be regulated hereby, for example the delivered pressure of the pump regulating the supply of motive fluid or steam to the pump.

The main object of the invention is to afford an automatically regulating valve which will be relatively simple in construction and operation, rugged and durable in use, and quickly responsive to changes in the controlling conditions. A particular object is to render the valve more sensitive by relieving the regulating pressure, and the parts directly operated by it, of the relatively heavy work of adjusting the valve; this being accomplished by the particular employment of a pilot device, the position of which is determined by the controlling pressure, the main valve thereupon determining its own position accordingly.

Other and further objects and advantages of the present invention will be explained in the following description of an illustrative embodiment of the invention or will be apparent to those conversant with the subject. To the attainment of the objects and advantages referred to the present invention consists in the novel valve and the novel features of combination, arrangement, and structure herein illustrated or described.

In the accompanying drawing the single figure is a substantially central longitudinal cross section of an automatically regulable valve illustrative of the present invention.

The drawing indicates what may be termed the supply pipe 6 leading for example from a feed pump, and beyond the valve the delivery pipe 7 extending to the boiler, the valve body or casing 8 being coupled between these pipes. The usual gaskets and attaching bolts are omitted for convenience, but will be understood to be supplied at this and other parts of the drawing. The valve casing has an integral extension 9 enclosing certain movable parts and attached to this are other extensions to be referred to later.

Within the valve body is a ported transverse wall or valve seat 10 with which cooperates the movable valve part or gate 11 to regulate the port opening and thereby the flow of water, steam or other fluid through the valve. The term gate is intended to include any form of means, such as disk or cone for more or less closing the port. The valve gate in the illustrated embodiment is shown as comprising the closing disk 11, with a conical extension 12 giving a better progressive regulation of the port opening, this extension having guiding wings 13 sliding through the seat or port 10; and the gate has an outwardly or upwardly extending stem or shank 14.

The present invention employs two pressure responsive devices which for convenience will be termed "diaphragms", although the term diaphragm is intended to include any equivalent pressure responsive device, such as a yieldingly held piston, a Bourdon tube, or other device converting pressure into movement. The main diaphragm 15 is shown as extending from the valve gate 11 to the valve casing or the extension 9 thereof. The type of diaphragm is shown which is known as a bellows diaphragm, this giving relatively elongated play and movement within a relatively small diameter. The inner end of the bellows diaphragm 15 is tightly connected or brazed to the valve gate and the outer end is tightly clamped between the flange of the casing extension 9 and the flange of an attached extension 16 therebeyond. These parts may be concentrically arranged, with the valve stem 14 movable longitudinally through the center of the bellows diaphragm, its outer end sliding within a guiding spider 17. The effective diameter and area of the bellows diaphragm are determinable by known rules, and should be substantially greater than the diameter and area of the valve seat opening or port 10 in the described embodiment; although a reversal of arrangement may be employed, as further below described.

The parts of the main valve having been referred to, the respective chambers and passages will be outlined. The valve casing encloses the entrance chamber 18 from which fluid passes directly through the valve seat or port to the delivery chamber 19. A restricted passage 20 is shown extending from the entrance chamber 18 to a chamber 21 beyond the gate and main diaphragm, and which may be termed the main pressure chamber. This restricted passage 20 is for the purpose of communicating the supply pressure from the supply pipe 6 or entrance chamber 18 to the pressure chamber 21. It is conveniently arranged as shown through the body of the valve gate 11, although it might be otherwise arranged, for example through the casing parts 9 and 16 or exteriorly. Within the attached extension 16 is shown a space 22 which is in free communication with the pressure chamber 21 and operatively constitutes a portion thereof. Whereas the passage 20 communicates the high supply pressure to the main pressure chamber 21 this pressure may be partly relieved through the provision of a special relief or outlet passage 23 extending from the chamber 21 and shown extending to the valve delivery chamber 19. For convenience this relief passage may extend longitudinally through the valve stem 14 and gate 11, for example as indicated. Normally the relief passage 23 is maintained in an adjustment almost but not quite closed, as will next be described. It should preferably be amply larger than the passage 20 to give a less restricted flow and thereby permit of quick relief of communicated pressure when open.

The controlling means or pilot valve may comprise a closure or gate 24, which may be in the form of a cone, or hemisphere, and which is movable relatively to the main valve gate 11 for the direct purpose of regulating the flow through the relief passage 23. The real purpose of the relative opening and closing movements as between the pilot valve or gate 24 and the main valve or its perforated stem 14 is to give a regulation of the pressure within the chamber 21, this regulation being specifically shown as effected by the members 14 and 24 by regulating the outflow through the passage 23, but the regulation might be of the inflow through the passage 20 by an appropriate arrangement, so long as the relative retraction of the pilot 24 brings about a decrease in pressure in the chamber 21 and thereby a further opening of the main valve. The pilot 24 is shown as regulating the interior pressure by controlling the relief of fluid therefrom. This pilot serves to open the relief channel further when the main valve closes too far, and vice versa, thereby controlling the main valve. The pilot or cone 24 is shown substantially but not quite closing the outer end of the passage 23. It will only be occasionally that this connection will be fully closed or widely opened.

The pilot valve gate 24 is shown as having an outwardly extending stem 25 with a head 26. A diaphragm 27 is shown extending from the gate 24 to the casing 16, this being a bellows diaphragm similar to the diaphragm 15 but of smaller diameter and length. The lower or inner extremity of the diaphragm 27 is attached to the conical gate 24 while the upper end is clamped between the top flange of the extension 16 and a superimposed bonnet 28. Within the bonnet is shown an auxiliary spring 29 which is frequently a useful supplement, this spring extending from the head 26 to an outer head 30 that is adjustable by a screw 31 to alter the force of the spring, these parts being packed and closed by a cap 32. A pipe 33 communicates the regulating pressure to the chamber 34 within the bonnet 28 and diaphragm 27, and which may be termed the pilot pressure chamber.

The apparatus as a whole may be briefly redescribed as an automatic valve having a casing enclosing the entrance and delivery chambers and the movable valve gate controlling the flow between them, in combination with a main diaphragm between the valve gate and casing and forming a main pressure chamber therebeyond, a restricted passage communicating pressure from the entrance chamber to the pressure chamber, a relief passage from the pressure chamber, preferably through the movable valve gate and to the delivery chamber, a pilot gate or cone movable relatively to the main gate for controlling said relief passage, a pilot diaphragm between the pilot gate and casing and forming a pilot pressure chamber therebeyond, and a passage communicating the regulating pressure to the pilot chamber. A reversal may be permitted in that the coaction of valve gate and pilot may control the pressure in the main pressure chamber by more or less restricting the admission thereto, in which case the relief passage should be suitably restricted.

The use of a pilot with diaphragm or pressure responsive device 27 of extended movement is advantageous, as this movement may thus correspond or equal the actual or expected maximum movement of the valve gate 11, so that reliable and direct control by the former over the latter is afforded. The bellows form of diaphragm 27 is of especial value as it keeps down the diameter, and as well gives a resilient resistance, although an added spring 29 permits adjustment.

The parts are shown in their position when a substantial flow is traversing the valve. The delivered pressure is of course lower than the supply pressure, and the invention will operate with a large variation of pressures, and pressure difference. The extent of opening of the valve is determined by the regulating pressure introduced to the pilot chamber 34 through the pipe 33. The actual position of the pilot gate or cone 24 will depend on the difference between the regulating pressure in the pilot chamber 34 and the pressure in the main pressure chamber 21, in connection of course with the elasticity of the diaphragm 27, and the spring 29. It will be clear that with the pilot gate 24 set in a certain position the main valve gate 11 will take its own position accordingly, this position being such that a very small rate of flow is permitted past the pilot gate 24 into the relief passage 23, and the pressure within the chamber 21 will normally be a pressure between the supply pressure and the delivery pressure of the valve such as to maintain this condition.

The normal balance of pressures operating on the main valve are such as to hold it in the described position in relation to the pilot. This will be readily understood by considering the main gate to be relatively lifted slightly, for example by the descent of the pilot, thus closing the escape of fluid through the relief passage 23. The static pressure within the chamber 21 will promptly be built up through the channel 20, to the full supply pressure existing at 18. This increased chamber pressure will change the balance and throw the main gate down slightly to its normal position in relation to the pilot gate 24. If on the other hand the main gate is lowered abnormally, or the pilot raised, this will open more widely the relief passage 23, which may be of substantially twice the diameter or four times the area of the passage 20. The pressure within the chamber 21 will thereupon drop substantially to the delivered pressure at 19 so that the unbalanced pressures on the main gate will cause it to rise until in normal relation to the pilot.

In this way the existing pressures through the main valve are utilized to cause the valve to adjust itself continuously to the position of the pilot valve, so that the regulating pressure in the pilot chamber is relieved of any but the small work of operating the pilot valve. Although wholly unattached the main valve follows promptly and exactly the pilot valve.

A practical instance may be as follows. With boiler pressure of 100 pounds per square inch at the delivery chamber 19, the pump may supply a pressure of 115 pounds at 18. The channel 20 conducting supply pressure to the pressure chamber 21 may be ⅛ inch diameter and the relief channel 23 of ¼ inch. The total movement of the pilot and main valve may be ½ inch. The pipe 33 may bring a regulating pressure varying between say 20 and 70 pounds, the pressure being higher with higher water level in the boiler, and vice versa, as explained in said patent. Assuming that with a given rate of feed to the boiler the level becomes too high, the pressure increase in the pilot chamber lowers the cone 24 and closes the relief passage 23. Immediately the pressure in chamber 21 rises, and this causes the descent of the main valve gate and reduction of water feed to the boiler.

The forces tending to lift or open the valve are (1) the difference between supply and delivered pressures times the seat area 10, plus (2) the delivered pressure times the effective area of diaphragm 15; while the force tending to lower or close the valve is the variable pressure within chamber 21 times the effective area of the diaphragm, which preferably exceeds the seat area. It follows that with any shift of the pilot cone the main valve will readjust itself until a slight leak or relief occurs, namely between the cone and the relief passage, such as to maintain in the chamber 21 a balancing pressure.

Initial adjustment of operation for varied conditions may be effected by the auxiliary spring 29, so that the valve may be caused to close tightly with a predetermined regulating pressure or excess of boiler water level; and the bellows diaphragms may be selected with characteristics suitable for the particular conditions at hand. Pursuant to certain special conditions an auxiliary spring may be added tending to open or close the main valve; while the pilot spring 29 may sometimes need to be a tension spring pulling up upon the pilot.

The pilot or gate 24 being movable relatively to the valve gate 11 for the purpose of controlling the chamber pressure, and thereby the valve adjustment, it is clear that the cooperation between the two gates may work either by the admission of the high pressure to the pressure chamber or by the escape of fluid therefrom. For example an ample pressure delivered into the chamber could have its inlet opened wider on descent of the pilot, and vice versa, so that by restricted escape the pressure is regulated and the valve gate readjusted. The cone 24 and valve stem 14 are shown coacting as a pilot valve gate and seat, but their relative approach and recession might otherwise regulate the flow and pressure, e. g. by a mechanical device operating laterally upon a separate inlet or escape valve.

There has thus been described a regulating valve embodying the principles and attaining the objects hereof. Since many matters of combination, arrangement and structure may be variously modified, within the principles hereof, it is not intended to limit the invention to such matters except to the extent set forth in the claims.

What is claimed is:

1. A pressure regulated valve having a casing, an adjustable gate controlling the flow through the valve from inlet to outlet, a diaphragm forming a main pressure chamber within the casing but removed from such inlet and outlet and arranged with the chamber pressure applied to adjust the valve gate, a passage leading from the valve inlet to the pressure chamber and an escape passage leading from the pressure chamber for relieving the pressure therein, a pilot valve comprising complementary valve members for controlling one of said passages and thereby the pressure in the pressure chamber, one of said pilot valve members being movable with the valve gate and the other being a movable pilot member, a pilot diaphragm connected for moving the pilot member and forming a pilot chamber within the casing, and means admitting regulating pressure to the pilot chamber; whereby when a change of regulating pressure moves the pilot diaphragm and pilot member the pilot valve is readjusted to cause change of pressure in the pressure chamber, whereby the valve gate is readjusted and thereby causes the first pilot valve member to move and restore the pilot valve adjustment.

2. A pressure regulated valve having a casing, an adjustable gate controlling the flow through the valve from inlet to outlet, a diaphragm of larger effective area than the valve gate extending from the casing to the valve gate and forming a main pressure chamber within the casing but removed from such inlet and outlet and arranged with the chamber pressure applied to adjust the valve gate, a passage leading from the valve inlet to the pressure chamber and an escape passage leading from the pressure chamber for relieving the pressure therein, a pilot valve normally partially open and comprising complementary valve members for controlling one of said passages and thereby the pressure in the pressure chamber, one of said pilot valve members being movable by the valve gate and the other being a movable pilot member, an independently operated pilot diaphragm for moving the pilot member extending from the casing to the pilot member and forming a pilot chamber within the casing, and means admitting regulating pressure to the pilot chamber; whereby when a change of regulating pressure moves the pilot diaphragm and pilot member inwardly the pilot valve is readjusted to cause increase of pressure in the pressure chamber, whereby the valve gate is readjusted inwardly and thereby causes the first pilot valve member to move inwardly and restore the normal pilot valve adjustment.

3. A pressure regulated valve having a casing, an adjustable gate controlling the flow through the valve from inlet to outlet, a metallic bellows diaphragm extending from the casing to the gate and forming a main pressure chamber within the casing but removed from such inlet and outlet and arranged with the chamber pressure applied to adjust the valve gate, a passage leading from the valve inlet to the pressure chamber and an escape passage leading from the pressure chamber to the valve outlet for relieving the pressure therein, a pilot valve comprising complementary members for controlling one of said passages and thereby the pressure in the pressure chamber, one of said pilot valve members being movable with the gate and the other being a movable pilot member, a pilot diaphragm extending from the casing to and carrying the pilot member and forming a pilot chamber within the casing, and means admitting regulating pressure to the pilot chamber, and an adjustable spring acting on the pilot member to modify the effect of the opposed fluid pressures thereon.

4. In a pressure regulated valve a casing enclosing inlet and outlet chambers, and a pressure chamber and a pilot chamber beyond the pressure chamber, with a valve seat between the inlet and outlet chambers; a valve gate adjustable in relation to said seat, a first pressure responsive device connected with the valve gate and operable by the pressure in the pressure chamber and movable in the casing to adjust the valve gate, a second pressure responsive device between the pressure chamber and the pilot chamber and subject to the opposing pressures therein, a restricted pressure passage from the inlet chamber to the pressure chamber, an escape passage from the pressure chamber less restricted than said pressure passage, a valve controlling said escape passage thereby to control the pressure in the pressure chamber, said control valve comprising a gate movable with the second pressure responsive device and a seat movable with the first device, and means admitting regulating pressure to the pilot chamber; whereby increase of regulating pressure shifts the control valve gate to further close it, followed by increase of pressure in the pressure chamber and therefore a shift of the main valve gate to further close it and to reopen the control valve.

5. A pressure regulated valve having a casing with valve seat, a movable gate above and controlling the flow therethrough, in combination with a main pressure responsive device above the valve seat connected for moving the valve gate and forming above it a main pressure chamber, a pressure passage communicating high pressure to the main pressure chamber, an escape passage from the pressure chamber for relieving the pressure therein, a pilot member movable relatively to the valve gate, a pilot valve operated by the relative movements of the pilot member and valve gate for controlling one of said passages, and thereby the main chamber pressure, a pilot pressure responsive device mounted above and independent of the valve gate and main pressure responsive device and connected for operating the pilot member and forming above it a pilot chamber, and means admitting regulating pressure to said pilot chamber; whereby change of regulating pressure to cause a given lowering of the pilot member operates the pilot valve to cause increase of main chamber pressure and thereby a corresponding lowering and closing of the valve gate towards its seat, and vice versa.

6. An automatic valve having the casing enclosing entrance and delivery chambers and valve seat, and a movable valve gate controlling the flow through the valve seat from one chamber to the other, in combination with a main pressure responsive device above the valve gate and within the casing forming a main pressure chamber above it, a restricted passage communicating pressure from the entrance chamber to the main pressure chamber, a relief passage from the main pressure chamber to the delivery chamber, a pilot valve comprising a pilot gate movable relatively to the valve gate for controlling flow through said relief passage, a pilot pressure responsive device mounted above and independent of the valve gate and main pressure responsive device and associated with the pilot gate for moving it and forming a pilot chamber above it, and a passage admitting regulating pressure to said pilot chamber.

7. An automatic regulating valve having a casing enclosing the entrance and delivery chambers, a movable valve gate controlling the flow therebetween, a main pressure responsive device arranged for moving the valve gate and forming a main pressure chamber therebeyond, a restricted passage communicating entrance chamber pressure to the main pressure chamber, a relief passage less restricted than said restricted passage extending from the main pressure chamber through the valve gate to the delivery chamber, a pilot gate movable independently of the main gate for controlling said relief passage, a pilot pressure responsive device arranged for moving the pilot gate and forming a pilot pressure chamber therebeyond, with the main pressure chamber separating the main and pilot pressure responsive devices, and a passage admitting regulating pressure to said pilot chamber, whereby the pilot responsive device is operated by the differential of the regulating pressure and that in the main pressure chamber.

8. In a pressure regulated valve a casing enclosing inlet and outlet chambers, a valve seat between the inlet and outlet chambers, a valve gate adjustable in relation to said seat, a main pressure chamber, a pilot chamber, means to admit regulating fluid pressure to the pilot chamber, a main pressure responsive device connected with the valve gate and exposed to the main pressure in the main pressure chamber, and movable to adjust the valve gate, a second or pilot pressure responsive device oppositely exposed to the pressure in the pilot chamber and that in the main chamber, a pressure passage from the inlet chamber to the main pressure chamber, an escape passage from the main pressure chamber to the outlet chamber, an escape valve controlling one of said passages thereby to control the pressure in the pressure chamber, said controlling valve comprising a seat member and cooperating gate member, and cooperating connections from both said pressure responsive devices to the respective members of the controlling valve, the connections from the pilot device arranged for changing the adjustment and those from the main device for subsequently restoring the adjustment of said controlling valve.

9. A pressure regulated valve having an enclosing casing with a valve seat and a movable gate controlling the flow therethrough, in combination with a main pressure responsive device connected for moving the valve gate and forming a main pressure chamber at its side opposite to said seat, a pressure passage communicating high pressure to the pressure chamber, an escape passage from the main pressure chamber for relieving the pressure therein, a normally open pilot valve comprising a pilot member movable relatively to the valve gate for controlling one of said passages and thereby the main chamber pressure, a pilot pressure responsive device connected for operating the pilot member and forming a pilot chamber at its side opposite to the main pressure chamber, and means admitting regulating pressure to said pilot chamber; whereby the pilot device is subject at its under side to the pressure in such pressure chamber and at its upper side to the regulating pressure, the pilot member displacements depending upon the difference in pressures below and above the pilot device, and the gate movements following those of the pilot member and restoring the normal relation of gate and pilot member and thereby the normal condition of the pilot valve.

GRANT CAMPBELL.